United States Patent
Shental et al.

(10) Patent No.: US 6,527,238 B2
(45) Date of Patent: Mar. 4, 2003

(54) STABILIZING SYSTEM FOR AN IMAGE-PRODUCING MEANS

(75) Inventors: Gad Shental, Holon (IL); Nir Shental, Holon (IL); Ran Shental, Holon (IL); Lev Hasharon, Zeran (IL)

(73) Assignee: Top I Vision LTD, Holon (IL)

( * ) Notice: Subject to any disclaimer, the term of this patent is extended or adjusted under 35 U.S.C. 154(b) by 0 days.

(21) Appl. No.: 10/061,069

(22) Filed: Jan. 29, 2002

(65) Prior Publication Data

US 2002/0100850 A1 Aug. 1, 2002

(30) Foreign Application Priority Data

Jan. 29, 2001  (IL) .................................................. 141156

(51) Int. Cl.[7] .............................. E04G 3/00; A47H 1/10
(52) U.S. Cl. ................................ 248/276.1; 248/278.1; 248/323; 248/324
(58) Field of Search ................................ 248/323, 324, 248/278.1, 276.1; 396/420, 429, 419, 421, 352, 243

(56) References Cited

U.S. PATENT DOCUMENTS

| | | | |
|---|---|---|---|
| 4,408,860 A | * 10/1983 | Barzee | ....................... 228/49.5 |
| 4,577,827 A | * 3/1986 | Eliscu | ....................... 248/183.4 |
| 4,764,008 A | * 8/1988 | Wren | ......................... 348/143 |
| 5,124,938 A | 6/1992 | Algrain | |
| 5,135,196 A | * 8/1992 | Schehr | ..................... 248/287.1 |
| 5,240,220 A | * 8/1993 | Elberbaum | ................ 248/276.1 |
| 5,897,223 A | 4/1999 | Tritchew et al. | |
| 5,954,310 A | 9/1999 | Soldo et al. | |
| 6,328,270 B1 | * 12/2001 | Elberbaum | ............. 248/288.31 |
| 6,354,749 B1 | * 3/2002 | Pfaffenberger, II | ......... 348/143 |

* cited by examiner

*Primary Examiner*—Ramon O. Ramirez
*Assistant Examiner*—Amy J. Sterling

(57) ABSTRACT

The invention provides a stabilizing system for an image-producing means operated on a non-stable platform, the system including a yaw axis attachable at one of its ends to the platform; an angularly bent arm comprising two limbs, to the first of which limbs the other end of the yaw axis is fixedly attached; a front roll axis mounted on, or integral with, the first limb; lateral structures rigidly linked by a connecting member and at least indirectly supported by the bent arm, between which lateral structures the image-producing means can freely perform a pitching movement; at least one pitch axis supported by at least one of the lateral structures; a rear roll axis fixedly attached to the connecting member and freely passing through the end portion of the second one of the limbs of the bent arm, the front roll axis and the rear roll axis being parallel, the front roll axis being positioned at a point above the lateral structures; a cross member pivotably mounted on the front roll axis, and at least one upright at each end of the cross member, one end of the upright being pivotably mounted on the cross member and its other end being articulated to one of the lateral structures; wherein the cross member and the uprights define a portal facilitating the unobscured passage of light.

5 Claims, 2 Drawing Sheets

STABILIZING SYSTEM FOR AN IMAGE-PRODUCING MEANS

FIELD OF THE INVENTION

The present invention relates to a stabilizing system for an image-producing means.

BACKGROUND OF THE INVENTION

Operating equipment, e.g., cameras, from non-stable platforms such as aircraft, naval craft, swaying masts, or the like, raises problems of stabilization: in order to keep the payload steady, it has to be mounted on a device controlled by motion sensors that will move in opposition to the movement of the platform, thereby canceling out the platform's movement and stabilizing the equipment. The movement of such platforms can be resolved into three axes, known in traditional naval terminology as the yaw, pitch and roll axes.

Existing stabilizers are not only complex pieces of machinery, but also, in certain situations, e.g., when the camera is dipped by an angle of 90°, the roll axis becomes co-linear with the yaw axis, becoming redundant and precluding roll stabilization. This is due to the kinematic chain of prior art stabilizers, which follows the scheme: yaw→pitch→roll. In other words, compensatory yaw affects both pitch and roll; compensatory pitch affects roll but not yaw, while compensatory roll has no effect on either yaw or pitch.

DISCLOSURE OF THE INVENTION

It is therefore one of the objects of the present invention to provide a stabilizing system that is relatively simple and comparatively inexpensive, and that is based on a kinetic chain free of redundancies and deficiencies.

According to the invention, the above object is achieved by providing a stabilizing system for an image-producing means operated on a non-stable platform, said system comprising a yaw axis attachable at one of its ends to said platform; an angularly bent arm comprising two limbs, to the first of which limbs the other end of said yaw axis is fixedly attached; a front roll axis mounted on, or integral with, said first limb; lateral structures rigidly linked by a connecting member and at least indirectly supported by said bent arm, between which lateral structures said image-producing means can freely perform a pitching movement; at least one pitch axis supported by at least one of said lateral structures; a rear roll axis fixedly attached to said connecting member and freely passing through the end portion of the second one of the limbs of said bent arm; said front roll axis and said rear roll axis being parallel, said front roll axis being positioned at a point above said lateral structures; a cross member pivotably mounted on said front roll axis, and at least one upright at each end of said cross member, one end of said upright being pivotably mounted on said cross member and its other end being articulated to one of said lateral structures, wherein said cross member and said uprights define a portal facilitating the unobscured passage of light.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1:
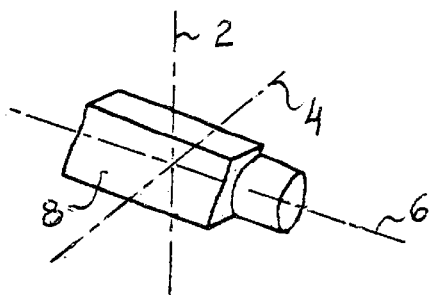
Figure 2:
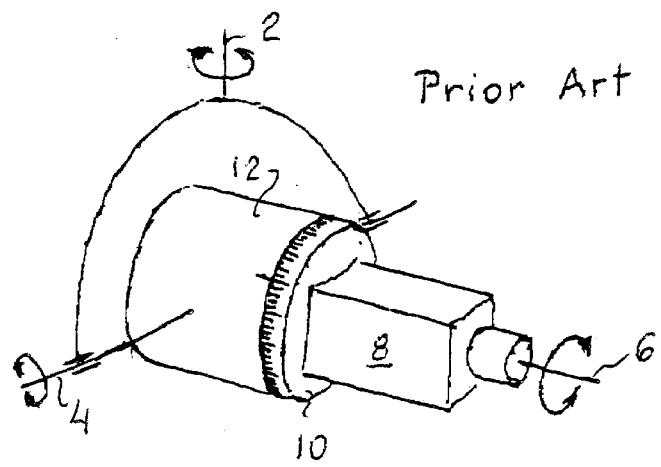
Figure 3:
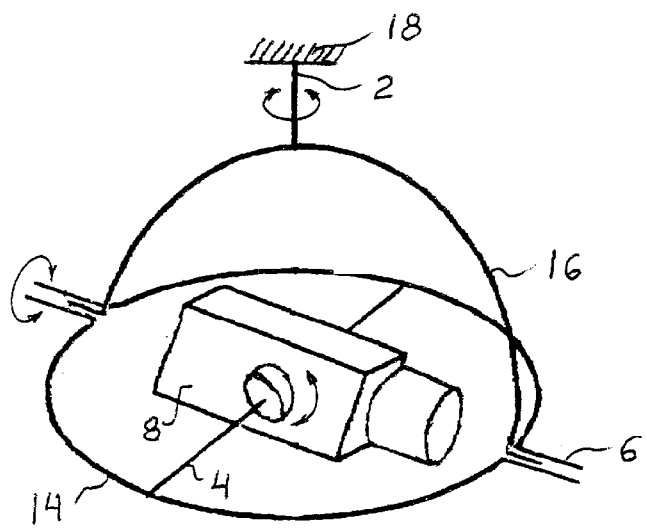
Figure 4:
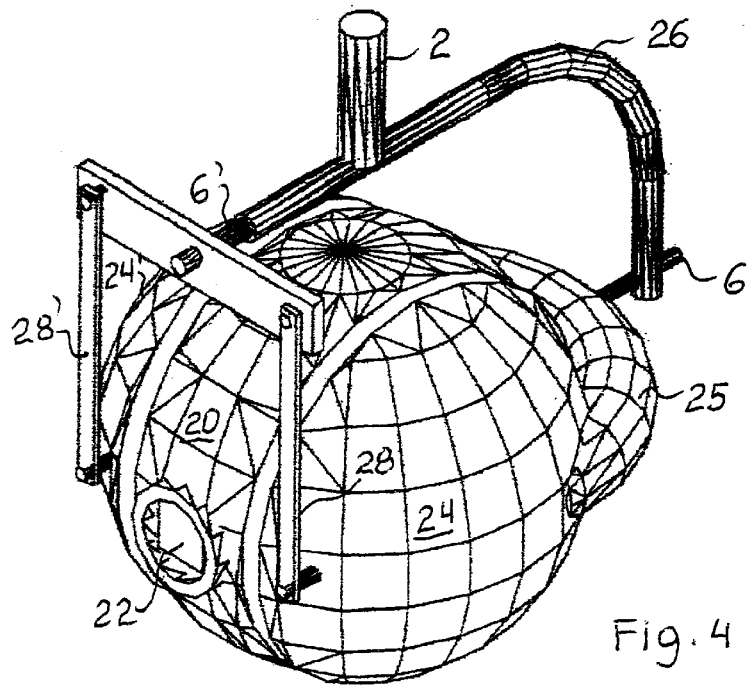
Figure 5:
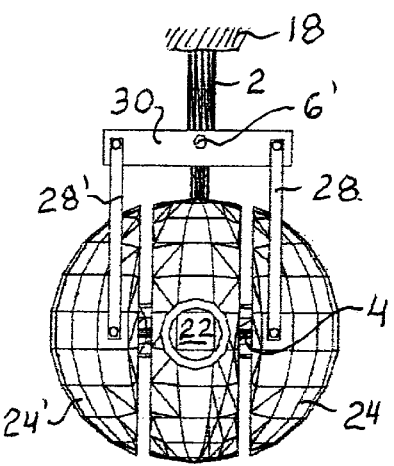
Figure 6:
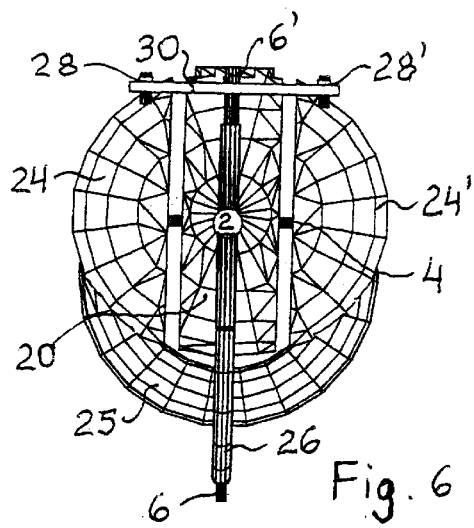

FIG. 1 defines the three axes into which the movements of an instrument-carrying platform can be resolved;

FIG. 2 schematically represents a prior art stabilizing system;

FIG. 3 illustrates a basic solution to the problem inherent in the prior art system of FIG. 2;

FIG. 4 is a perspective view of the stabilizing system according to the present invention;

FIG. 5 is a front view of the system of FIG. 4;

FIG. 6 is a top view of the system of FIG. 4, and

Figure 7:
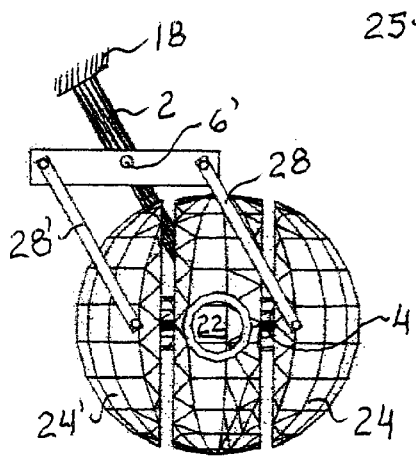

FIG. 7 is a front view, showing the system in action when the platform rolls or banks.

DETAILED DESCRIPTION

Referring now to the drawings, FIG. 1 defines the three axes into which the movement of a platform carrying an instrument, e.g., a camera 8, can be resolved, to be counteracted by appropriate compensatory movements of the camera 8 about one or more of these axes. Seen are the yaw axis 2, the pitch axis 4 and the roll axis 6.

FIG. 2 is a schematic representation of a prior art stabilizing system. Seen is a camera 8, the optical axis of which coincides with roll axis 6. Camera 8 is attached to a flange 10 rotatably mounted on a body 12. It can be clearly seen that when camera 8 is dipped by 90°, the roll axis 6 will become co-linear with yaw axis 2 as discussed above, where it was shown that this is due to the kinematic chain of such prior art devices.

The stabilization system of the present invention is based on a different kinematic chain, namely, yaw→roll→pitch, in which compensatory yaw does not effect roll and each axis maintains its action independently, without redundancies and deficiencies.

FIG. 3 illustrates the basic scheme underlying the system according to the invention, showing camera 8 suspended on two arms defining the pitch axis 4 and fixedly connected to frame 14, the ends of which define the front and rear ends, respectively, of roll axis 6. Frame 14 is suspended from a bow-like member 16 fixedly connected to yaw axis 2, which, in turn, is attached to platform 18 with one degree of freedom in rotation.

While the above-described arrangement of FIG. 3 overcomes the deficiency of the prior art mentioned, it is still impractical as a camera suspension because, as is clear from FIG. 3, the line of sight of the camera is obscured over a wide and important angular range by frame 14 and bow member 16. The stabilizer of the present invention solves this problem by splitting the roll axis into two: front roll axis 6' and rear roll axis 6, and by raising front roll axis 6 to a point above camera casing 20, while keeping axis 6' co-planar and parallel with rear roll axis 6. As a result, a free field of view for the camera is attained for all reasonable angles of dip, while the roll axis function is fully retained.

FIG. 4 is a perspective view of the stabilizing system according to the present invention. There is seen a casing 20 accommodating camera 8 (not visible) and comprising a window 22 through which light can reach the camera. Casing 20 is mounted on pitch axes 4 (FIGS. 5, 6) and supported in cheek-like lateral structures 24, 24', mounted with clearance on both sides of casing 20. Structures 24, 24' are linked to one another by an arched member 25, to which they are fixedly attached or are integral. Member 25 clears casing 20, as is clearly shown in FIG. 6.

It will be appreciated that, in principle, camera 8 could be directly attached to pitch axes 4, eliminating the need for casing 20.

Yaw axis 2, constituted by a shaft, is solid with a bent arm 26. Rear roll axis 6 freely passes through the end portion of the vertical part of arm 26, while front roll axis 6' is mounted in the horizontal part of the arm.

Further shown are two uprights 28, 28'. The lower ends of uprights 28, 28' are pivotably attached to lateral structures 24, 24', respectively, and the upper ends of the uprights are pivotably attached to a cross member 30, the center of which rides on front roll axis 6'. It is clearly seen that uprights 28, 28' and cross member 30 define a portal, providing the unobstructed access of light to camera 8, as well as constituting the sides of a parallelogram which enables the system to roll in compensation for a rolling movement of platform 18. Thus, when platform 18, e.g., an airplane on a straight course, begins to roll or bank as indicated in FIG. 7, its movement is at once sensed and reacted to by a compensatory counter-movement of the roll drive. As a result, casing 20 and the enclosed camera retain their original positions, i.e., they stay in a vertical plane, in spite of the banking tilt of the airplane.

FIGS. 5 and 7 also illustrate how the rectangular shape of the portal, in a non-roll situation of platform 18, turns into a rhomboid when the platform starts to roll or bank.

It should be noted that no detailed mention has been made of movement sensors, drives connected to the axes and electronic controls, all of which are per se known and commercially available, and which are used by all stabilizing systems.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A stabilizing system for an image-producing means operated on a non-stable platform, said system comprising:

a yaw axis attachable at one of its ends to said platform;

an angularly bent arm comprising two limbs, to the first of which limbs the other end of said yaw axis is fixedly attached;

a front roll axis mounted on, or integral with, said first limb;

lateral structures rigidly linked by a connecting member and at least indirectly supported by said bent arm, between which lateral structures said image-producing means can freely perform a pitching movement;

at least one pitch axis supported by at least one of said lateral structures;

a rear roll axis fixedly attached to said connecting member and freely passing through the end portion of the second one of the limbs of said bent arm, said front roll axis and said rear roll axis being parallel, said front roll axis being positioned at a point above said lateral structures;

a cross member pivotably mounted on said front roll axis, and at least one upright at each end of said cross member, one end of said upright being pivotably mounted on said cross member and its other end being articulated to one of said lateral structures;

wherein said cross member and said uprights define a portal facilitating the unobscured passage of light.

2. The system as claimed in claim 1, wherein said lateral structures are at least partly hollow.

3. The system as claimed in claim 1, wherein said yaw axis is a shaft connected to said platform with one degree of freedom in rotation.

4. The system as claimed in claim 1, further comprising a casing connected to said at least one pitch axis and disposed between said lateral structures.

5. The system as claimed in claim 4, wherein said casing is provided with a protective, light-transparent window.

* * * * *

UNITED STATES PATENT AND TRADEMARK OFFICE
CERTIFICATE OF CORRECTION

PATENT NO.   : 6,527,238 B2
DATED        : March 4, 2003
INVENTOR(S)  : Gad Shental et al.

It is certified that error appears in the above-identified patent and that said Letters Patent is hereby corrected as shown below:

<u>Title page,</u>
Item [75], Inventors, delete "Lev Hasharon" and insert -- Lev Pessachis --

Signed and Sealed this

Nineteenth Day of August, 2003

JAMES E. ROGAN
*Director of the United States Patent and Trademark Office*